United States Patent [19]

Ono

[11] Patent Number: 5,353,178
[45] Date of Patent: Oct. 4, 1994

[54] METHOD OF DETECTING A CHANNEL SEPARATION PITCH IN A MULTI-TRACK TAPE RECORDER

[75] Inventor: Hitoshi Ono, Nagano, Japan

[73] Assignee: Sankyo Seiki Mfg. Co., Ltd., Nagano, Japan

[21] Appl. No.: 115,392

[22] Filed: Aug. 31, 1993

Related U.S. Application Data

[63] Continuation of Ser. No. 534,963, Jun. 7, 1990, abandoned.

[30] Foreign Application Priority Data

Jun. 8, 1989 [JP] Japan ................ 1-145765

[51] Int. Cl.⁵ .............................................. G11B 5/56
[52] U.S. Cl. .................................. 360/78.02; 360/76; 360/77.12
[58] Field of Search .............. 360/75, 76, 77.01, 77.02, 360/77.12, 77.13, 77.15, 78.01, 78.02, 105–107, 109, 77.04, 77.06

[56] References Cited

U.S. PATENT DOCUMENTS

| | | | |
|---|---|---|---|
| 4,472,750 | 9/1984 | Klumpp et al. | 360/78.02 |
| 4,796,125 | 1/1989 | Karsh | 360/77.12 |
| 4,866,548 | 9/1989 | Rudi | 360/78.02 |

*Primary Examiner*—Jerry Smith
*Assistant Examiner*—Steven R. Garland
*Attorney, Agent, or Firm*—McAulay Fisher Nissen Goldberg & Kiel

[57] ABSTRACT

There is provided a method to be applied to a tape recorder of the type for storing and retrieving reference signals on a plurality of tracks of a magnetic tape by a magnetic head comprising, as integral parts thereof, writing sections and reading sections arranged at a given pitch for at least two channels for detecting a signal on a reference position of a track by a related one of the reading sections of the magnetic head for each channel. This is done by moving the magnetic head in order to detect the positional relationship between the related writing and reading sections of the magnetic head and the track on the magnetic tape for each channel. With such a method, the track-seek operation for locating the track and, hence, the data reading operation by use of a data backup tape recorder of the above described type can be accurately carried out on the basis of the positional relationship and, consequently, the number of unsuccessfully attempted reading operations as well as hard errors due to such operations can be effectively reduced.

5 Claims, 5 Drawing Sheets

METHOD OF DETECTING A CHANNEL SEPARATION PITCH IN A MULTI-TRACK TAPE RECORDER

This is a continuation, of application Ser. No. 07/534,963, filed Jun. 7, 1990, now abandoned.

BACKGROUND OF THE INVENTION

1. Field of the Invention

This invention relates to a method of detecting the channel separation pitch of a tape recorder to be used for data backup application.

2. Background Prior Art

A conventional tape recorder for data backup applications normally stores and retrieves data in and from as many as 9, 15 or 18 tracks on a single magnetic tape by means of a magnetic head, which comprises, as integral parts thereof, a writing section realized by winding a wire around a core having a writing gap and a reading section realized by winding a wire around a core having a reading gap, which is wider than the writing gap. The writing section and the reading section are arranged in a direction parallel to the running direction of the magnetic tape and operational for a single channel. For writing data on a magnetic tape with such a data backup tape recorder, the writing section of the magnetic head writes a reference signal on the central track for providing a reference and then data on this and other tracks by following a certain procedure. For retrieving the data from the magnetic tape, on the other hand, the reading section of the magnetic head reads the reference signal and then seeks a track on the magnetic tape specified by the reference signal so that the magnetic head starts reading the data from the track.

Recently, there have been proposed data backup tape recorders that can store data and retrieve data in and from as many as 26 tracks on a single magnetic tape. As illustrated in FIG. 8, magnetic head 11 of such a tape recorder comprises, as integral parts thereof, a pair of erasing sections each having a core around which a wire is wound, a pair of writing sections each having a core around which a wire is wound, the cores of the writing sections being respectively provided with writing gaps 13a, 13b, and a pair of reading sections each having a core around which a wire is wound. The cores of the reading sections are respectively provided with reading gaps 14a, 14b. The writing section having the writing gap 13a and the reading section having the reading gap 14a are arranged along the running direction of the magnetic tape in this order and constitute respectively a writing section and a reading section for a lower channel, while the writing section having the writing gap 13b and the reading section having the reading gap 14b are arranged along the direction opposite to the running direction of the magnetic tape in this order and constitute respectively a writing section and a reading section of an upper channel. The writing sections and the reading sections for these two channels are arranged at a predetermined pitch in a direction perpendicular to the running direction of the magnetic tape. For head 11 shown in FIG. 8, the pitch is the distance between two imaginary parallel lines, one joining the centers of reading gap 14a and writing gap 13a (which form one channel) and one joining the centers of reading gap 14b and writing gap 13b (which form another channel). The width of the cores of the writing sections is 178 μm and that of the cores of the reading sections is 127 μm, which is considerably smaller than the width of any conventional cores which is normally 267 μm.

For a data backup tape recorder of this known type, a magnetic tape 19 provided with a number of marks comprising a BOT (Begin Of Tape) mark 15, an EOT (End Of Tape) mark 16, an EW (Early Warning) mark 17 and a LP (Load Point) mark 18, as illustrated in FIG. 7, is used. Each of the marks 15 through 18 is in fact one (or more than one) hole(s) formed through the tape 19 and arranged along the center line of the upper half portion and/or that of the lower half portion of the tape as seen in its running direction. The BOT mark 15 and the EOT mark 16 are respectively located at the front and rear ends of the magnetic tape 19, whereas the EW mark 17 and the LP mark 18 are located on the center line of the upper half portion of the magnetic tape 19 and separated respectively from the BOT mark 15 and the EOT mark 16 by a given distance toward the middle of the tape. For storing data in a magnetic tape 19 by a data backup tape recorder of this type, magnetic tape 19 is moved rightward as seen in FIG. 8 and the writing section of magnetic head 11 having writing gap 13a for writing data in the lower channel is activated so that a reference signal having a specific frequency $f_0$ is written in reference signal recording area 20 immediately after BOT 15 is located on the center line of the lower half portion of magnetic tape 19 and then data are written in data recording area to located after the reference signal recording area 20.

Thereafter, magnetic tape 19 is moved leftward and the writing section of magnetic head 11 having writing gap 13b for writing data in the upper channel is activated so that a reference signal with frequency $f_0$ is written in reference signal recording area 21 immediately after EOT 16 located on the center line of the upper half portion of magnetic tape 19. Then, data are written in data recording area t1 located after the reference signal recording area 21. Then again, magnetic tape 19 is moved rightward and the writing section of magnetic head 11 having writing gap 13a for writing data in the lower channel is activated so that a reference signal having a specific frequency $f_1$ is written in reference signal recording area 22 immediately after BOT 15 located on the center line of the lower half portion of magnetic tape 19. Then, data are written in data recording area t2 after the reference signal recording area 22. Thereafter, magnetic tape 19 is moved leftward and the writing section of magnetic head 11 having writing gap 13b for writing data in the upper channel is activated so that a reference signal with frequency $f_1$ is written in reference signal recording area 23 immediately after EOT 16 located on the center line of the upper half portion of magnetic tape 19. Then data are written in data recording area t3 located after the reference signal recording area 23. In a similar manner, magnetic tape 19 is moved alternately rightward and leftward so that reference signals with frequency $f_1$ and data are recorded by means of the magnetic head 11 respectively in reference signal recording areas 24, 25, ... 31 and data recording areas t4, t5, ... t11 in the upper and lower half portions of magnetic tape 19. Then, magnetic tape 19 is again moved alternately rightward and leftward so that data are written by means of magnetic head 11 in data recording areas t12, t13 .... t24 in the upper and lower half portions of the magnetic tape 19. Finally, magnetic tape 19 is moved rightward so that reference signals with frequency $f_1$ and data are respectively recorded in reference signal recording area 32 and data recording area t25.

For retrieving the data stored in magnetic tape 19, magnetic head 11 of the data backup tape recorder is moved in a direction perpendicular to the running direction of the tape to seek the track of the tape that stores the data to be retrieved and the data stored in the data recording area of that track is then read out by means of the reading section having the reading gap 14a or 14b, whichever appropriate, of magnetic head 11. More specifically, if the track that stores the data to be retrieved is in the lower half portion of magnetic tape 19, the tape will be moved rightward and the reading section having reading gap 14a will be used for data retrieval, whereas the tape will be moved leftward and the reading section having the reading gap 14b will be activated for retrieving data stored in any of the tracks in the upper half portion of magnetic tape 19.

PROBLEMS TO BE SOLVED BY THE INVENTION

A data backup tape recorder of the type described above having a magnetic head equipped with two-channel writing and reading sections can exhibit an uneven pitch at which the channels of the magnetic head are arranged and also an azimuth angle when the magnetic head is mounted on the recorder. No measures are usually taken for correcting the pitch at which the channels of the magnetic head are arranged. This is because the writing cores of a conventional magnetic head are 165 $\mu$m wide while the reading cores are 267 $\mu$m wide and, therefore, wider than any of the writing cores by approximately 100 $\mu$m. This makes any irregularity in the pitch of channel arrangement practically negligible. Consequently, the pitch at which the channels of the magnetic head is arranged differs for every data backup tape recorder. This causes a problem when the data recorded on a tape by a data backup tape recorder are retrieved by another data backup tape recorder, particularly, when the former tape recorder is of inferior quality with little care taken for the pitch of channel arrangement. In such case, either of the reading sections of the latter tape recorder will find it difficult to seek and accurately locate the target track and, therefore, attempts for retrieving data may turn out to be unsuccessful. Furthermore, the fact that the reading cores of such a magnetic head 11 are narrower than the writing cores makes the data retrieval operation even more difficult, entailing unsuccessfully repeated attempts for retrieving data and resulting in hard errors.

PRIMARY OBJECT OF THE INVENTION

It is therefore a primary object of the present invention to provide an improved method of accurately detecting the positional relationship between the writing sections and reading sections of a magnetic head and the track on the magnetic tape for each channel of the magnetic head so that track seek operations and, therefore, data retrieval operations may be carried out correctly and successfully. The invention thus encompasses a method which is free from the above described drawbacks.

In accordance with the method of the present invention, a method to be applied to a tape recorder having a plurality of sets of tracks, wherein the recorder stores and retrieves reference signals using a magnetic head having writing sections and reading sections arranged at a given pitch for at least two channels, comprises the steps of detecting a signal at a reference position of a track by means of a related one of the reading sections of the magnetic head for each set of tracks by a predetermined movement of the magnetic head and determining the relative positional relationship between the related writing and reading sections of the magnetic head and the sets of tracks on the magnetic tape based on the detected signals.

The present invention will now be described in greater detail by referring to the accompanying drawings that illustrate the preferred embodiments and best mode of carrying out the invention.

DESCRIPTION OF THE PREFERRED EMBODIMENTS

Figure 1:
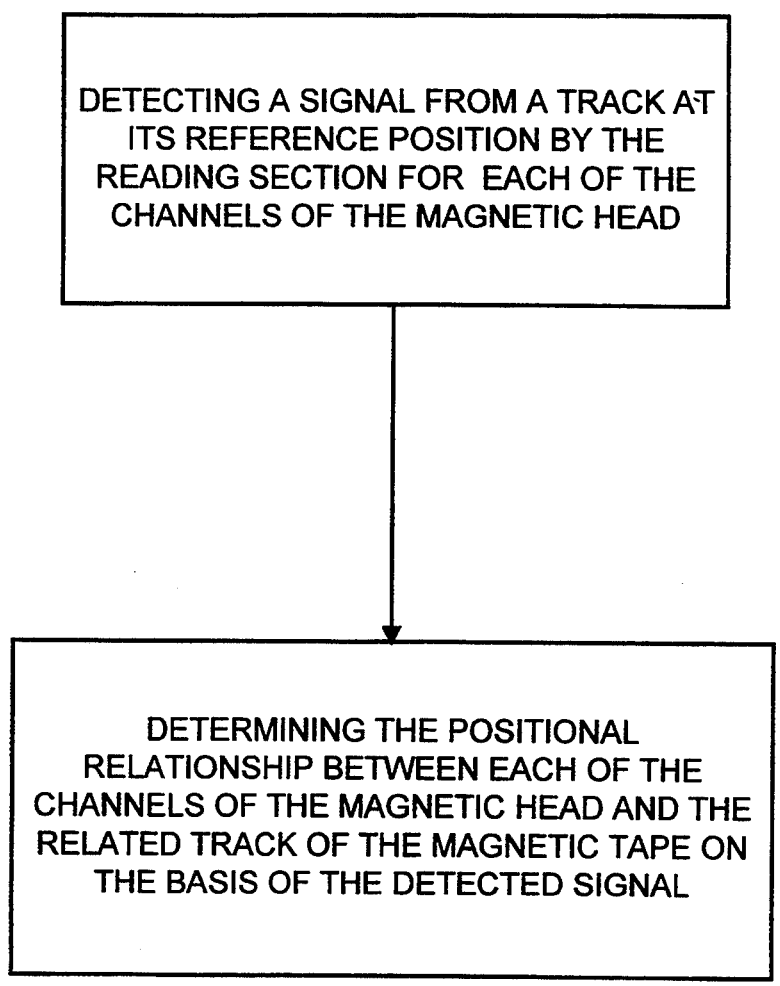
FIG. 1 is a basic flow chart showing how the method of the invention carried out.
Figure 2:
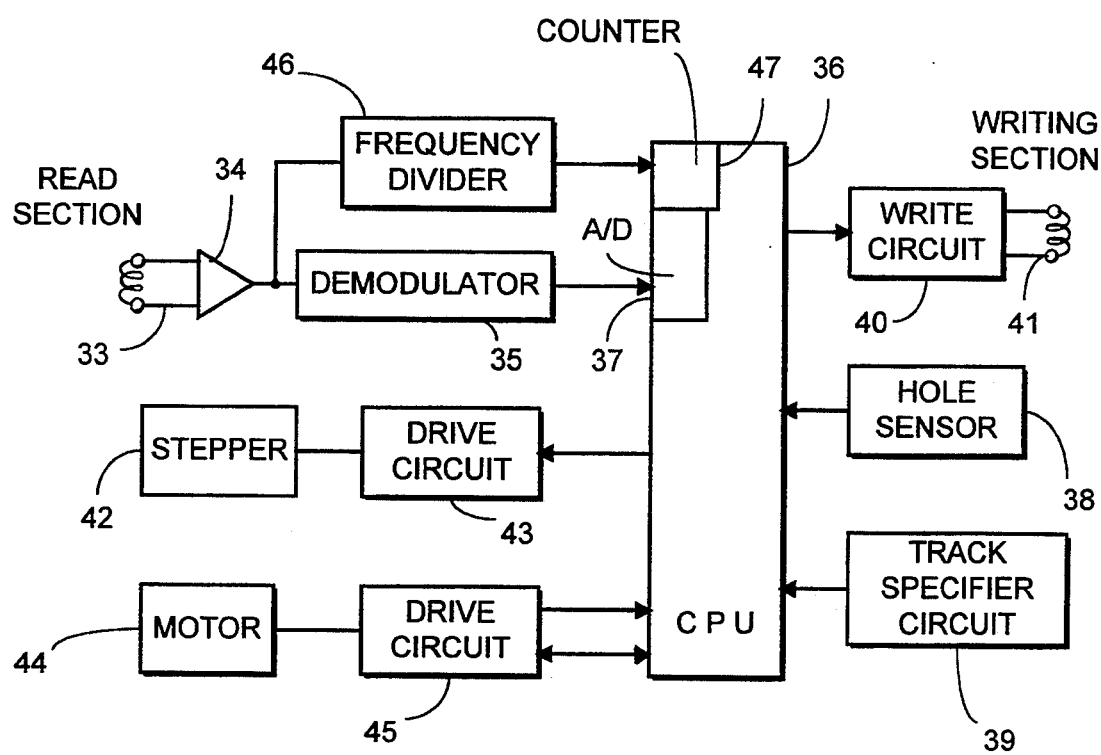
FIG. 2 is a block diagram showing the circuit configuration of a data backup tape recorder to which the method of the invention is applied.

FIG. 2 of the accompanying drawings illustrates, in block diagram form, the circuit configuration of a data backup tape recorder to which the method of the invention is applied.

With this data backup tape recorder, data are written and read in and from as many as twenty six tracks arranged on a magnetic tape 19 by means of a magnetic head 11. The principal features of magnetic tape 19 and magnetic head 11 have been described above. Signals retrieved from reading section 33 having a reading gap 14a or 14b and amplified by amplifier 34 and whose envelope is extracted by demodulator 35 enter analog/digital converter 37 of microcomputer (CPU) 36. The retrieved signals from amplifier 34 are frequency divided by read data frequency divider 46 and supplied to CPU 36. CPU 36 counts the number of signals retrieved and transmitted from read data frequency divider 46 by means of counter 47 and determines the frequency of the signals. Hole sensor circuit 38 detects holes 15 through 18 through the magnetic tape 11 and sends a detection signal to CPU 36, while track specifier circuit 39 sends a track signal representing the track specified by the operator to CPU 36. Write circuit 40 selectively drives an erasing section having a erasing gap 12 or writing section 41 having reading gap 14a or 14b depending on the control signal transmitted from CPU 36. Stepper 42 plays the role of moving magnetic head 11 in a direction perpendicular to the running direction of magnetic tape and driving circuit 43 drives stepper circuit 42 in accordance with the control signal transmitted from CPU 36. Motor 44 is driven by driving circuit 45 to make magnetic tape 19 run at a predetermined rate or, conversely, driving circuit 45 drives motor 44 according to the control signal transmitted from CPU 36. Driving circuit 45 comprises a tacho-generator for detecting the rate of rotation of motor 44 and the pulse representing the rate of rotation of the motor is transmitted to CPU 36.

While a data writing operating is being carried out, CPU 36 causes driving circuit 45 to drive motor 44 so that magnetic tape 19 runs rightward and activates the writing section having writing gap 13a of magnetic head 11 for the lower channel by way of write circuit 40. Write circuit 40 writes a reference signal having a specific frequency $f_0$ in reference signal recording area 20 located after BOT 15 on the center line of the lower half portion of the magnetic tape 19 and then data in data recording area t0. Then, CPU 36 causes magnetic tape 19 to run leftward and activates the writing section having writing gap 13b of magnetic head 11 for the upper channel to write a reference signal having the specific frequency $f_0$ in reference signal recording area 21 located after EOT 16 on the center line of the lower half portion of the magnetic tape 19 and, then, data in data recording area t1. Thereafter, CPU 36 causes the magnetic tape 19 to run rightward and activates the writing section having writing gap 13a of magnetic head 11 for the lower channel to write a reference signal having a specific frequency $f_1$ in reference signal recording area 22 located after BOT 15 on the center line of the lower half portion of the magnetic tape 19 and, then, data in data recording area t2. Then again, CPU 36 causes the magnetic tape 19 to run leftward and activates the writing section having the writing gap 13b of the magnetic head 11 for the upper channel to write a reference signal having the specific frequency $f_1$ in reference signal recording area 23, located after EOT 16 on the center line of the upper half portion of magnetic tape 19, and, then, data in data recording area t3. In a similar manner, CPU 36 moves magnetic tape 19 alternately rightward and leftward so that reference signals having a specific frequency $f_1$ and data re recorded by means of the magnetic head 11, respectively, in reference signal recording areas 24, 25, ... 31 and data recording areas t4, t5, ... t11 in the upper and lower half portions of magnetic tape 19 and then again magnetic tape 19 is moved alternately rightward and leftward so that data are written by means of magnetic head 11 in data recording areas t12, t13, ... t24 in the upper and lower half portions of magnetic tape 19. Finally, magnetic tape 19 is moved rightward so that reference signals having a specific frequency $f_1$ and data are respectively recorded in reference signal recording area 32 and data recording area t25. For retrieving data, CPU 36 causes driving circuit 43 to drive stepper 42 in accordance with the track specifying signal transmitted from track specifying circuit 21 to move magnetic head 11 of the data backup tape recorder in a direction perpendicular to the running direction of magnetic tape 19 in order to seek the track of the tape that stores the data to be retrieved; the data stored in the data recording area is then read out by means of the reading section having reading gap 14a or 14b, whichever appropriate, of magnetic head 11. The retrieved signals are processed by means of amplifier 34 and demodulator 35 and undergo an A/D conversion by A/D converter 37 for further processing. More specifically, if the track that stores the data to be retrieved is in the lower half portion of magnetic tape 19, the tape will be moved rightward and the reading section having reading gap 14a will be used for data retrieval, whereas the tape will be moved leftward and the reading section having reading gap 14b will be activated for retrieving data stored in any of the tracks in the upper half portion of the magnetic tape 19.

Figure 3:
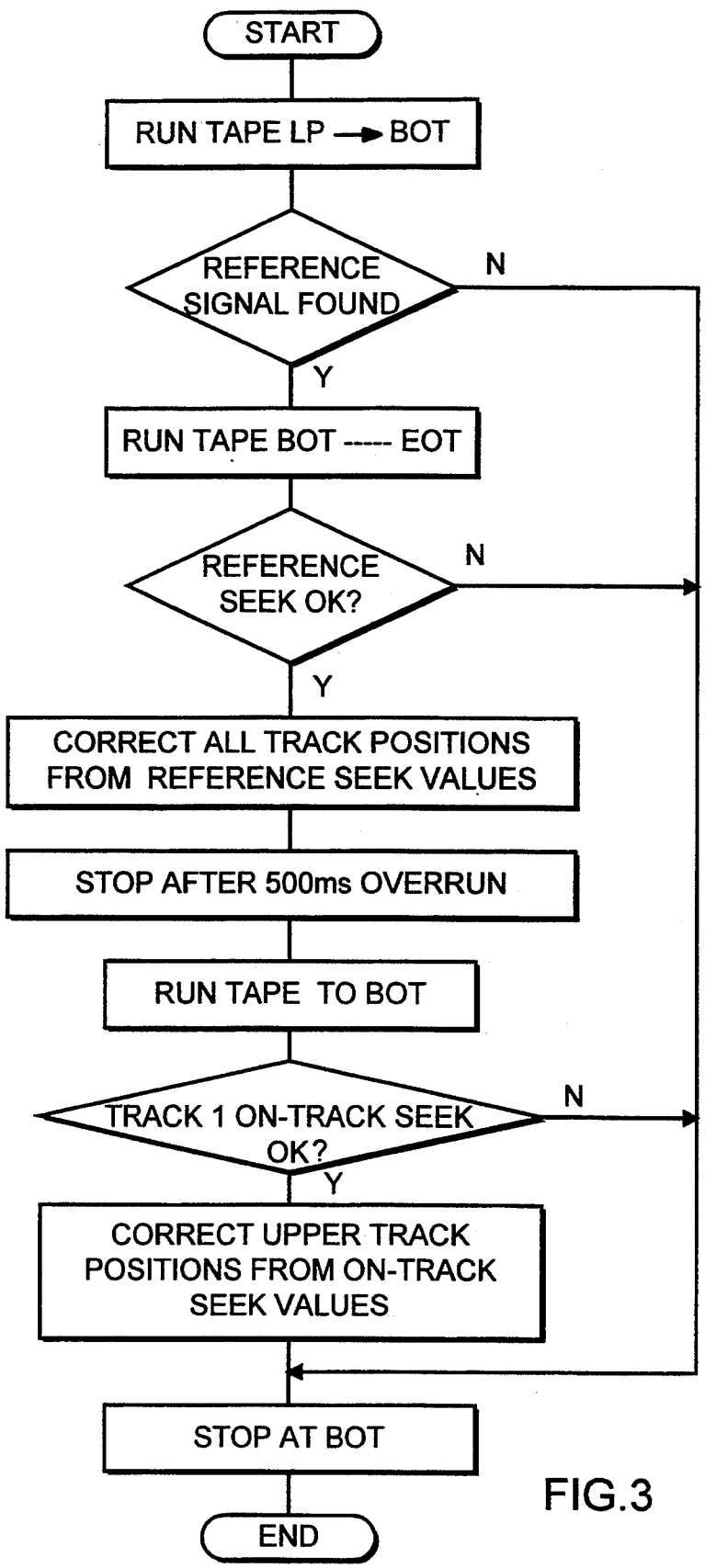
FIG. 3 is a flow chart showing how the process of the method of the present invention is conducted by the CPU of the data backup tape recorder of FIG. 2.
Figure 4A:
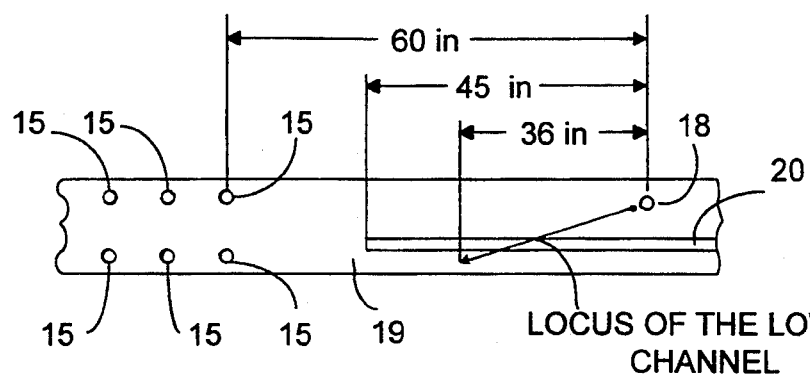
FIGS. 4(a) through 6(b) are illustrations to assist in the description of the data backup tape recorder of FIG. 2.
Figure 4B:

While CPU 36 of a data backup tape recorder to which the method of the invention is applied is following a certain track-seek procedure in the initial stages of a data retrieval operation as described above, the tape recorder performs an inter-channel pitch correcting operation the moment a magnetic tape is loaded to it as described below, referring to the flow chart of FIG. 3. Firstly, CPU 36 causes drive circuit 45 to drive motor 44 to feed magnetic tape 19 so that magnetic head 11 shows a relative movement from LP18 toward BOT 15 as illustrated in FIG. 4. At the same time, drive circuit 43 drives stepper 42 to move magnetic head 11 in order to determine if the signal retrieved by way of the lower channel reading section of magnetic head 11 and amplifier 34 and counted by counter 47 is a reference signal with frequency $f_0$ which is retrieved from the reference signal recording area 20. At this stage, CPU 36 also receives the retrieved signal by way of the reading section, amplifier 34 and demodulator 35 to determine its maximum value m. Note that the reference signal recording areas 20, 21 are shown in an exaggerated way in FIGS. 4(a) through 6(a) as compared with the other areas.

Figure 5A:
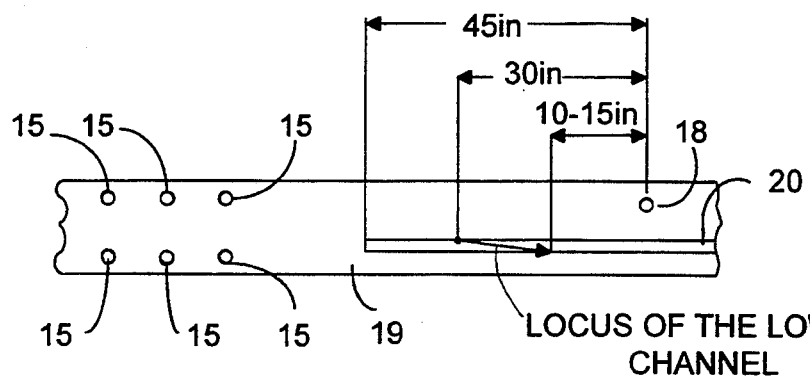
Figure 5B:
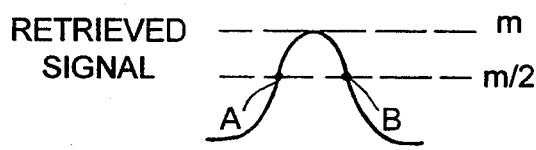
Figure 6A:
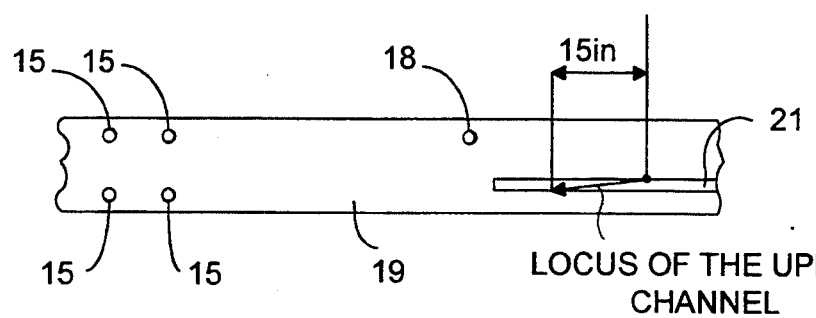
Figure 6B:
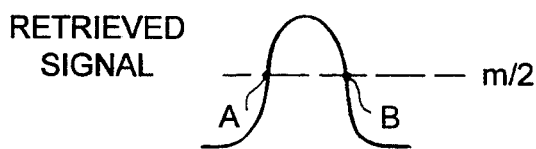
Figure 7:
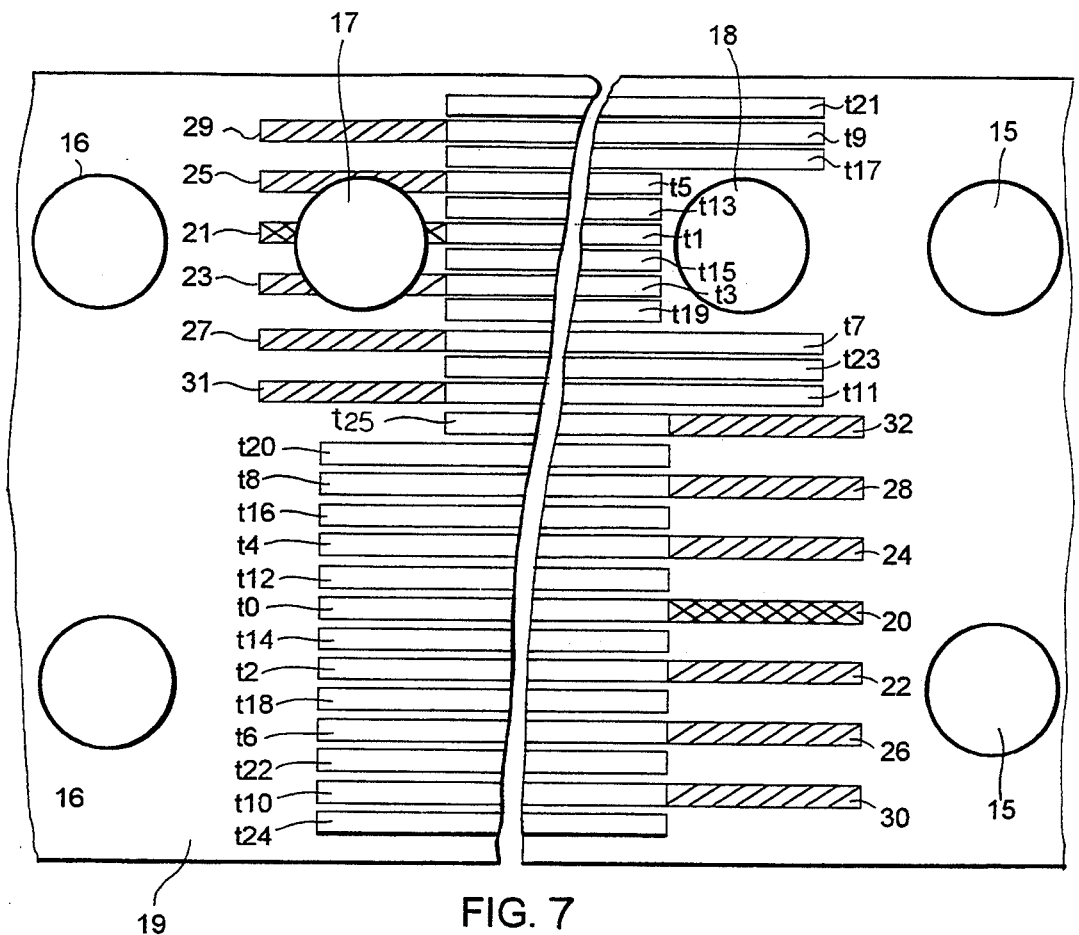
FIG. 7 is a schematic plan view of a part of a magnetic tape that can be used with the data backup tape recorder of FIG. 2.
Figure 8:
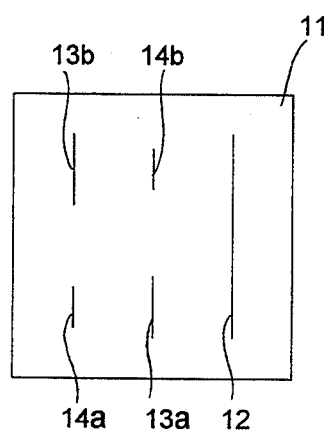
FIG. 8 is a schematic front view of a magnetic head of the data backup tape recorder of FIG. 2.

If the retrieved signal is the reference signal with frequency $f_0$ stored in reference signal recording area 20, CPU 36 causes drive circuit 45 to drive motor 44 to move magnetic tape 19 so that magnetic head 11 shows a relative shifting movement from BOT 15 toward EOT 16 as illustrated in FIGS. 5(a) and (b). At the same time, drive circuit 43 drives stepper 42 so that the lower channel reading section of magnetic head 11 crosses track 0, which contains the reference recording area 20, for providing a reference for the lower half portion of magnetic tape 19 and the data recording area to while the signals obtained by the lower channel reading section of magnetic head 11 are processed by way of amplifier 34 and demodulator 35 in order to determine the position of the lower channel of magnetic head 11 relative to the central position of track 0 on the magnetic tape 19. This is done by determining the middle position between points A and B where the reference signal shows a predetermined level (for instance ½ of the maximum value m). Then, CPU 36 corrects the positional data for each of all the tracks of magnetic tape 19 stored in the memory (since the track seek operation is quantitatively defined by the data stored for the positions) on the basis of the detected actual position of the lower channel of magnetic head 11 relative to the central position of track 0 on magnetic tape 19. Then, after a period of 500 ms has elapsed, CPU 36 causes drive circuit 45 to drive motor 44 to feed tape 19 so that magnetic head 19 shows a relative movement toward BOT 15 and, at the same time, drive circuit 43 drives stepper 42 so that the upper channel reading section of magnetic head 11 crosses track 1 that contains the reference recording area 21 for providing a reference for the upper half portion of magnetic tape 19 and the data recording area t1 while the signal obtained by the upper channel reading section of magnetic head 11 is processed by way of amplifier 34 and read data frequency divider circuit 46 and counted by means of counter 47 in order to determine if the retrieved signal agrees with the reference signal with frequency $f_0$ to be retrieved from the reference signal recording area 21 or not. If the answer to this question is yes or the retrieved signal agrees with the reference signal with frequency $f_0$ to be retrieved from the reference signal recording area 21, CPU 36 determines the position of the upper channel of magnetic head 11 relative to the central position of track 1 on magnetic tape 19 by determining the middle position between points A and B where the reference signal shows a predetermined level (for instance ½ of the maximum value m). Then, CPU 36 corrects the position data for each of the tracks of the upper half portion of magnetic tape 19 stored in the memory on the basis of the position of the upper channel of magnetic head 11 relative to the central position of the track 1 on magnetic tape 19. Thereafter, CPU 36 causes drive circuit 45 to stop motor 44 when magnetic head 11 has performed a relative movement to reach BOT 15.

By detecting the position of the lower channel of magnetic head 11 relative to the central position of the track 0 on magnetic tape 19 and the position of the upper channel of magnetic head 11 relative to the central position of the track 1 on magnetic tape 19 and correcting the positional data for each of the tracks stored in the memory, it is obvious that the track-seek operation and hence the data retrieval operation can be accurately carried out on the basis of the positional data stored in the memory.

As is apparent from the above description, a data backup tape recorder, to which the method of the present invention is applied, for storing and retrieving reference signals and data in and from a plurality of tracks on a single magnetic tape by means of a magnetic head, comprising, as integral parts thereof, writing sections and reading sections arranged for at least two channels, detects a signal from the track for a reference position by means of the magnetic section for the related channel by relatively moving the magnetic head and the positional relationship between the writing section and the reading section for the related channel of the magnetic head and the track on the magnetic tape on the basis of the detected signal. Therefore, the track-seek operation for locating the track and hence the data reading operation can be accurately carried out on the basis of the positional relationship and consequently the number of unsuccessfully attempted reading operations as well as hard errors due to such operations can be effectively reduced.

While the foregoing description and drawings represent the preferred embodiments of the present invention, it will be obvious to those skilled in the art that various changes and modifications may be made therein without departing from the true spirit and scope of the present invention.

What is claimed is:

1. A pitch correcting method to be applied to a tape recorder of the type for storing in a memory and retrieving track positional data of a plurality of tracks of a magnetic tape using a magnetic head having a first writing section and separate reading section defining a first channel and a second writing section and separate reading section defining a second channel, said channels being arranged at a given pitch therebetween, said tracks constituting a first track set and a second track set, said first track set corresponding to said first channel and said second track set corresponding to said second channel, each track set having a standard track, said method comprising the steps of:
   a) reading the standard track of the first track set with the first channel;
   moving the magnetic head across the standard track of the first track set while reading the standard track;
   detecting a position of the first standard track from a reading signal; and
   correcting positional data of said first track set in the memory based on the difference between said detected position and the positional data;
   b) reading the standard track of the second track set with the second channel;
   moving the magnetic head across the standard track of the second track set while reading the standard track;
   detecting a position of the second standard track from a reading signal; and
   correcting positional data of said second track set in the memory based on the difference between said detected position and the positional data.

2. The method of claim 1 including the steps of forming a signal from said magnetic tape having a carrier frequency corresponding to that recorded in a standard track and an envelope having a maximum value, removing said carrier frequency to extract the envelope and determining the maximum value, and wherein said measure of the position of the track is determined using a predetermined ratio of said maximum value of said envelope.

3. The method of claim 2 wherein said predetermined ratio is ½.

4. The method of claim 2 wherein said position of said standard track is a central position.

5. In a multi-track tape recorder for storing and retrieving signals on a plurality of tracks of a magnetic tape having a magnetic head having a first writing section and separate reading section defining a first channel and second writing section and separate reading section defining a second channel, said channels being arranged at a given pitch therebetween, means for moving said head, means for driving said tape and means for storing track position information, the improvement comprising:
   a system for pitch correction of the pitch of the channels of the magnetic head in said tape recorder relative to corresponding sets of tracks on said magnetic tape, each set of tracks corresponding to one of said channels, including;
   means for detecting a first positional signal derived from the reading section of said first channel of said head responsive to the movement of said head across a first track of a first set of tracks on said tape and for detecting a second positional signal derived from the reading section of said second channel of said had responsive to the movement of said head across a second track of a second set of tracks on said tape, said first and second positional signals corresponding to a pitch distance between said sets of tracks relative to the pitch between channels; and
   means for correcting stored positional information of said sets of tracks based on said first and second positional signals,
   wherein said first and second positional signal being derived from corresponding tracks having a stored signal of a predetermined frequency, said first and second positional signals being modulated signals having said predetermined frequency as a carrier, means for extracting the envelope of said modulated signals and means for determining the occurrence of a maximum point of said envelope, said point of occurrence corresponding to the center of a track.

* * * * *